United States Patent
Himmelmann

(10) Patent No.: US 9,812,917 B2
(45) Date of Patent: Nov. 7, 2017

(54) END TURN SUPPORT AND COOLING FIXTURE

(71) Applicant: Hamilton Sundstrand Corporation, Charlotte, NC (US)

(72) Inventor: Richard A. Himmelmann, Beloit, WI (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 332 days.

(21) Appl. No.: 14/508,762

(22) Filed: Oct. 7, 2014

(65) Prior Publication Data

US 2016/0099624 A1    Apr. 7, 2016

(51) Int. Cl.
| H02K 3/24 | (2006.01) |
| H02K 9/19 | (2006.01) |
| H02K 16/00 | (2006.01) |
| H02K 3/46 | (2006.01) |
| H02K 3/51 | (2006.01) |

(52) U.S. Cl.
CPC .............. *H02K 3/46* (2013.01); *H02K 3/24* (2013.01); *H02K 3/51* (2013.01); *H02K 9/19* (2013.01); *H02K 16/00* (2013.01)

(58) Field of Classification Search
CPC ............ H02K 3/24; H02K 3/51; H02K 3/527; H02K 3/46; H02K 9/19; H02K 9/193; H02K 9/197; H02K 9/20
USPC ....................................................... 310/54, 61
See application file for complete search history.

(56) References Cited

U.S. PATENT DOCUMENTS

| 859,361 | A | * | 7/1907 | Behrend | .................. H02K 3/51 |
| | | | | | 310/262 |
| 3,500,093 | A | * | 3/1970 | Wharton | ................ H02K 3/527 |
| | | | | | 310/214 |
| 4,937,486 | A | | 6/1990 | Schwanda | |
| 5,003,207 | A | * | 3/1991 | Krinickas | ................ H02K 9/19 |
| | | | | | 310/184 |
| 5,666,016 | A | * | 9/1997 | Cooper | .................. H02K 3/527 |
| | | | | | 310/270 |
| 6,225,723 | B1 | | 5/2001 | Cooper | |

(Continued)

FOREIGN PATENT DOCUMENTS

| FR | 2897895 | | 8/2007 | | |
| FR | 2897895 | A1 * | 8/2007 | ............. | F01D 15/10 |

(Continued)

OTHER PUBLICATIONS

Kremer, machine translation of FR2897895, Aug. 2007.*

(Continued)

*Primary Examiner* — Quyen Leung
*Assistant Examiner* — Eric Johnson
(74) *Attorney, Agent, or Firm* — Snell & Wilmer, L.L.P.

(57) ABSTRACT

A generator rotor system having various features is disclosed. The generator rotor system has at least one main stage generator rotor with winding-pole sets spaced annularly about the rotor. The tendency of the windings to distort and or displace under the centrifugal force of the spinning rotor is ameliorated by a winding retention member disposed axially outboard of the winding-pole sets. The winding retention member may also have a one or more cooling oil routing hole to enhance the flow of cooling oil among the windings.

10 Claims, 7 Drawing Sheets

(56) References Cited

U.S. PATENT DOCUMENTS

| | | | |
|---|---|---|---|
| 6,465,928 B1* | 10/2002 | Shervington | H02K 1/24 310/269 |
| 6,707,205 B2 | 3/2004 | Johnsen | |
| 6,734,585 B2* | 5/2004 | Tornquist | H02K 1/325 310/52 |
| 6,885,120 B2 | 4/2005 | Kaminsky et al. | |
| 8,120,227 B2 | 2/2012 | Leroy | |
| 2003/0094872 A1 | 5/2003 | Tornquist et al. | |
| 2004/0051405 A1 | 3/2004 | Doherty et al. | |
| 2007/0222333 A1* | 9/2007 | Hattori | H02K 3/51 310/270 |
| 2008/0122311 A1 | 5/2008 | Werst | |
| 2009/0083966 A1 | 4/2009 | McCabe et al. | |
| 2010/0283352 A1* | 11/2010 | Lemmers, Jr. | H02K 1/22 310/216.115 |
| 2010/0320850 A1* | 12/2010 | Lemmers, Jr. | H02K 9/19 310/54 |
| 2010/0320860 A1* | 12/2010 | Patel | H02K 3/527 310/194 |
| 2011/0291518 A1 | 12/2011 | McCabe | |
| 2012/0126643 A1* | 5/2012 | Zhong | H02K 1/32 310/59 |
| 2013/0106211 A1* | 5/2013 | Holzner | H02K 3/38 310/62 |
| 2014/0354091 A1* | 12/2014 | Yamada | H02K 11/042 310/54 |
| 2016/0099621 A1 | 4/2016 | Himmelmann | |

FOREIGN PATENT DOCUMENTS

| | | | |
|---|---|---|---|
| GB | 696760 A * | 9/1953 | H02K 3/51 |
| JP | 2009273266 | 11/2009 | |

OTHER PUBLICATIONS

Extended European Search Report dated May 2, 2016 in European Application No. 15188318.8.

Extended European Search Report dated Feb. 24, 2016 in European Application No. 15188115.8.

Preinterview First Office Action dated Dec. 30, 2016 in U.S. Appl. No. 14/508,843.

First Action Interview Office Action dated Mar. 31, 2017 in U.S. Appl. No. 14/508,843.

* cited by examiner

END TURN SUPPORT AND COOLING FIXTURE

FIELD

The present invention relates to the field of high-speed electrical machines, and more specifically, high-speed electrical machines having rotor windings end turn support and cooling fixtures.

BACKGROUND

Many electrical machines operate at high speeds, so that significant centrifugal force is exerted on components of the electrical machine, such as the windings. As a result, the windings may be distorted or displaced, causing wear and premature failure. Moreover, many electrical machines operate at high current densities, causing component heating, which increases the winding ductility, accelerating wear and failure.

SUMMARY OF THE INVENTION

A main stage generator rotor is disclosed. The main stage generator rotor may include a winding-pole set having a winding and a pole, and a winding retention member. The main stage generator rotor may have an axis of rotation, and the axis of rotation may have a radius. The winding retention member may be disposed outboard of the winding-pole set along the axis of rotation. The winding retention member may axially confine the winding of the winding-pole set between the winding retention member and the pole of the winding-pole set. Moreover, the winding of the winding-pole set may be constrained by the winding retention member from radially translating.

The winding retention member may include an axial containment plate disposed outward of the axis of rotation with respect to the winding of the winding-pole set and constraining the winding from radially translating. The winding retention member may also have a tensioning apparatus whereby the axial containment plate is retained in position relative to the winding-pole set, and a cooling oil routing hole whereby cooling oil may travel radially through the axial containment plate.

A generator rotor system is also disclosed. The generator rotor system may include a first exciter rotor, a second exciter rotor, a permanent magnet rotor, a first main stage generator rotor, and a second main stage generator rotor. Each of the first main stage generator rotor and the second main stage generator rotor may share an axis of rotation. The first exciter rotor may be disposed at an axial outboard end of the generator rotor system. The permanent magnet rotor may be disposed at a second axial outboard end of the generator rotor system. The second exciter rotor may be disposed adjacent to and axially inboard of the permanent magnet rotor. The first main stage generator rotor and the second main stage generator rotor both may be disposed axially inboard of the first exciter rotor and the second exciter rotor. Each of the first main stage generator rotor and the second main stage generator rotor may include a winding-pole set including a winding and a pole, and a winding retention member. As stated, the first main stage generator rotor and the second main stage generator rotor may share an axis of rotation, wherein the axis of rotation has a radius. The winding retention member may be disposed outboard of the winding-pole set along the axis of rotation. The winding of the winding-pole set may be axially confined between the winding retention member and the pole of the winding-pole set, and the winding of the winding-pole may be constrained by the winding retention member from radially translating.

BRIEF DESCRIPTION OF THE DRAWINGS

A more complete understanding of the present invention may be derived by referring to the detailed description and claims when considered in connection with the Figures, where like reference numbers refer to similar elements throughout the Figures, and:

DETAILED DESCRIPTION

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from the scope of the appended claims.

For the sake of brevity, conventional techniques for manufacturing and construction may not be described in detail herein. Furthermore, the connecting lines shown in various figures contained herein are intended to represent exemplary functional relationships and/or physical couplings between various elements. It should be noted that many alternative or additional functional relationships or physical connections may be present in a practical method of construction.

Aircraft often have the need to produce electrical power. To produce this electrical power while limiting weight, the rotor of aircraft generators often spin at very high rotational speeds. Moreover, aircraft generators often operate with very high current densities. These factors result in large centrifugal forces on components of the generator, such as the windings, as well as large thermal dissipations, which accelerates component degradation and wear.

In various aircraft generators, the windings may tumble radially outward from the axis of rotation under centrifugal force. This tumbling is often associated with stretching of the wire making up the windings. For example, a winding may tumble axially outward of an adjacent wire, and then slide radially outward over the top of that adjacent wire. Over time, the tumbling wire may work its way radially outward of its designed location, stretching and ultimately failing.

Figure 1:
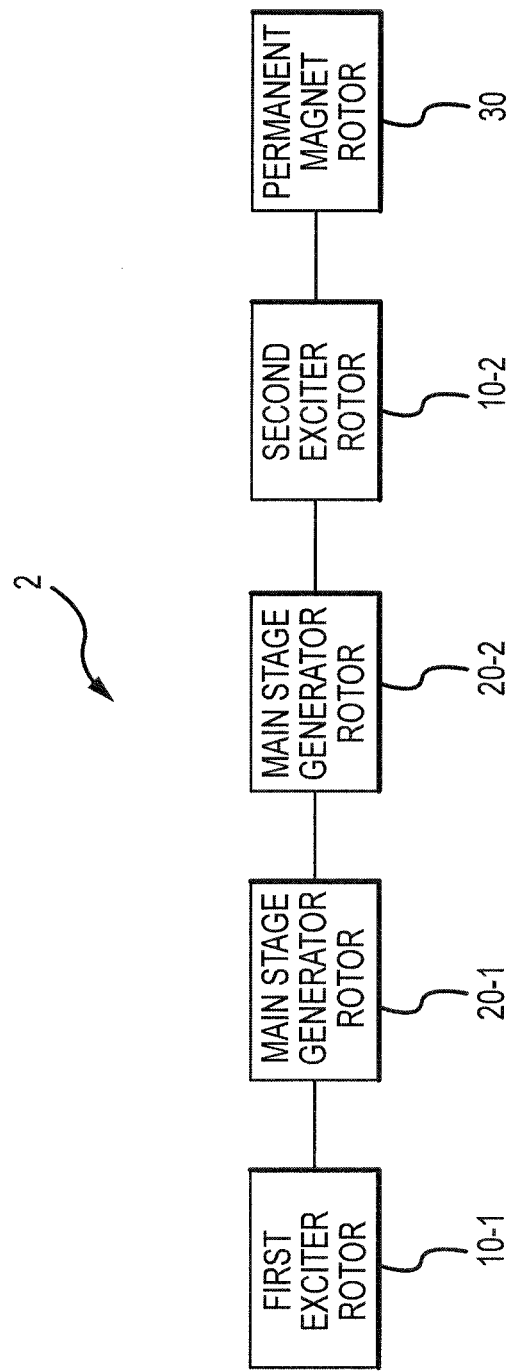
FIG. 1 illustrates a block diagram of an example rotor system of a high speed electrical machine, in accordance with various embodiments.
Figure 2:
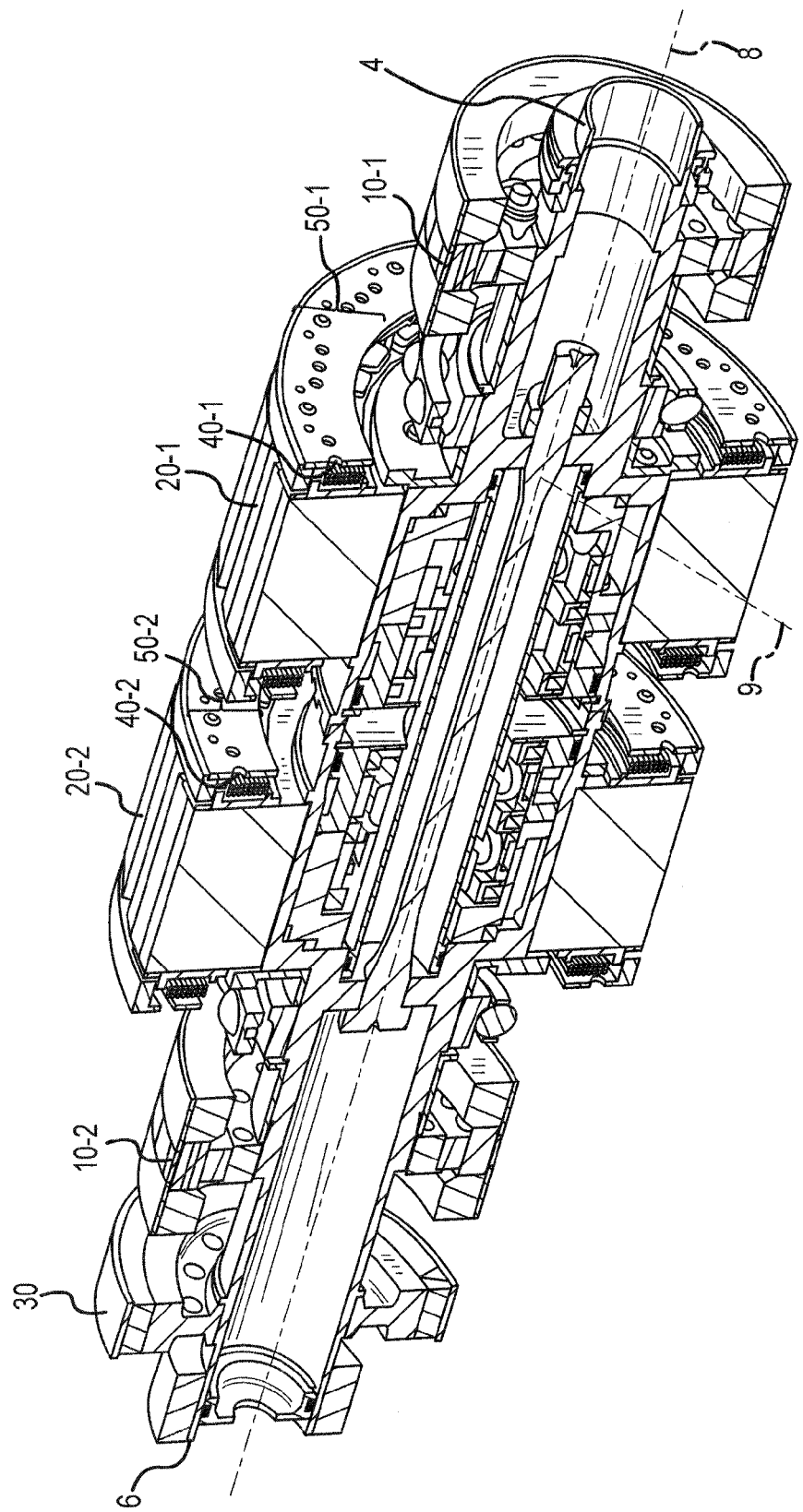
FIG. 2 illustrates an example rotor system of a high speed electrical machine having an end turn support and cooling fixture, in accordance with various embodiments.

To address this failure mode, an end turn support and cooling fixture is disclosed. With reference to FIGS. 1 and 2, a high-speed electrical machine may comprise a wound field synchronous generator. As such, the high speed electrical machine may comprise a generator rotor system 2 comprising one or more exciter rotor 10, for example, a first exciter rotor 10-1 and a second exciter rotor 10-2, one or more main stage generator rotor 20, for example a first main stage generator rotor 20-1 and a second main stage generator rotor 20-2, and a permanent magnet rotor 30.

The various rotors may be arranged as illustrated in FIG. 2. Specifically, the first exciter rotor 10-1 may be adjacent to a first main stage generator rotor 20-1 and the second exciter rotor 10-2 may be adjacent to a second main stage generator rotor 20-2. The first exciter rotor 10-1 may be disposed at a first axially outboard end 4 of a generator rotor system 2. The first main stage generator rotor 20-1 may be axially inboard of the first exciter rotor 10-1. A permanent magnet rotor 30 may be disposed at a second axially outboard end 6 of a generator rotor system 2. A second exciter rotor 10-2 may be axially inboard of the second exciter rotor 10-2. In this manner, an exciter rotor may be paired with a corresponding main stage generator rotor, and the pairs may be positioned axially along the length of the generator rotor system 21. At one end, for instance, a second axially outboard end 6 of the generator rotor system 2, a permanent magnet rotor 30 may be positioned. However, one may appreciate that any sequence or arrangement of rotors maybe implemented. For example, a first main stage generator rotor 20-1 and second main stage generator rotor 20-2 may be disposed between the first exciter rotor 10-1 and the second exciter rotor 10-2, or any desired arrangement maybe chosen.

The first main stage generator rotor 20-1 and the second main stage generator rotor 20-2 may share an axis of rotation 8, about which they rotate. Moreover, the axis of rotation 8 may have a radius 9, the radius 9 originating from the axis of rotation 8 and extending to the radially outermost edge of the first main stage generator rotor 20-1 and/or the second main stage generator rotor 20-2.

The generator may operate in various ways. For instance, with reference to FIGS. 1, 2, and 3B, an AC current may be generated by an excitation stage (an exciter rotor 10) which is then rectified, creating a DC current. The DC current is conducted through the windings 42 of a plurality of winding-pole sets 40 arranged annularly around the axis of rotation 8 of each main stage generator rotor 20. Each winding 42 wraps around a pole 44, thus forming a winding-pole set 40. As the current flows through the each winding 42, a magnetic field is created on each pole 44. The main stage generator rotor 20 is mechanically rotated about an axis of rotation 8, thus rotating the plurality of winding-pole sets 40 arranged annularly around the axis of rotation 8 of the main stage generator rotor 20. In response to this rotating, an alternating current is generated in a main generator stator (not shown) located radially outward of the main stage generator rotor 20. This alternating current is harvested, and optionally rectified or otherwise processed, and distributed across the aircraft.

As discussed, because the main stage generator rotor(s) 20 are mechanically rotated about the axis of rotation 8, each winding 42 associated with the main stage generator rotor(s) 20 is subject to dislocation and distortion. Moreover, because the current flowing through the windings 42 is large, it is desirable to cool the windings 42, such as by directing oil to flow over the windings 42 and/or to further cool other components, such as main generator stator(s) located radially outward of the main stage generator rotor(s) 20.

Figure 3A:
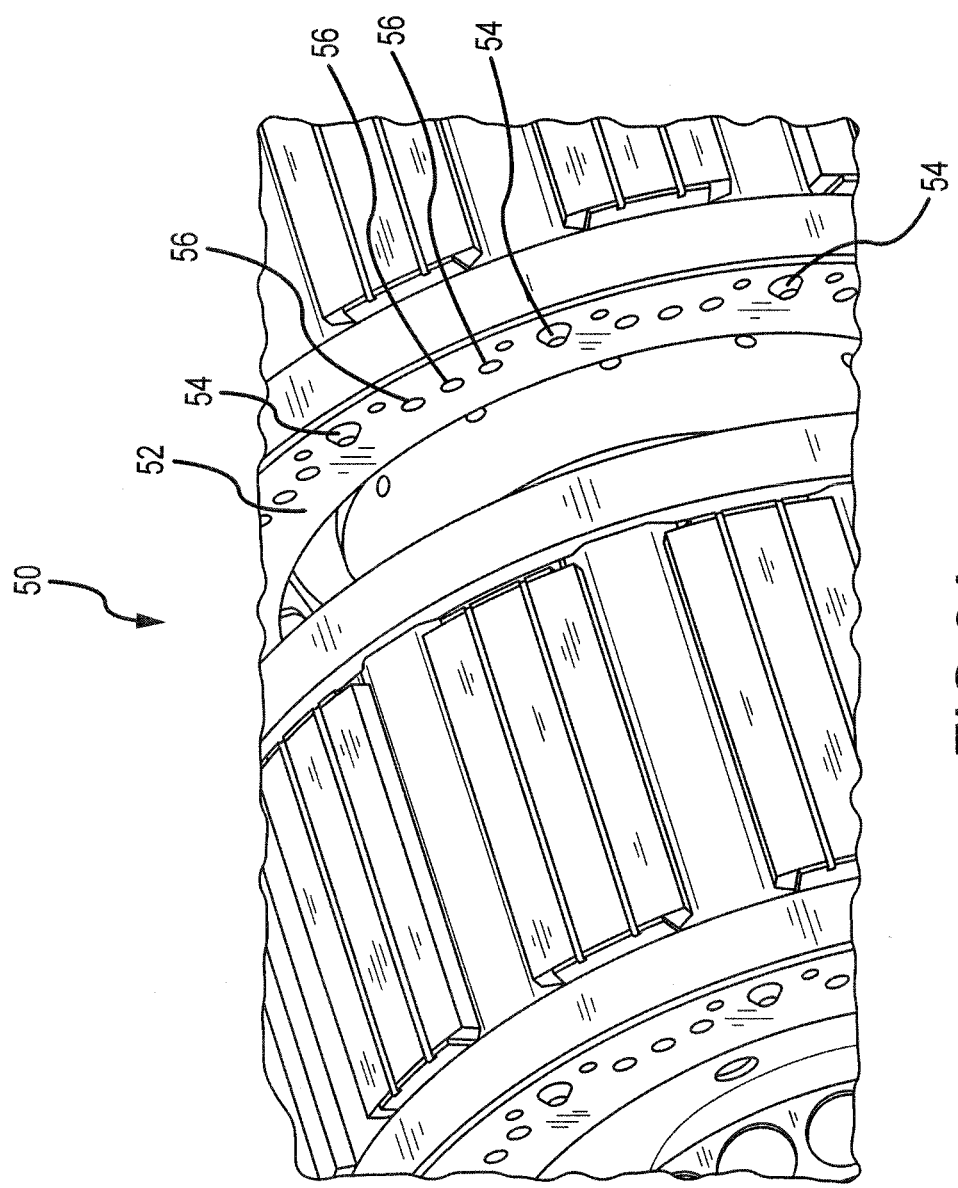
FIG. 3A illustrates an close-up view of an end turn support and cooling fixture, in accordance with various embodiments.
Figure 3B:
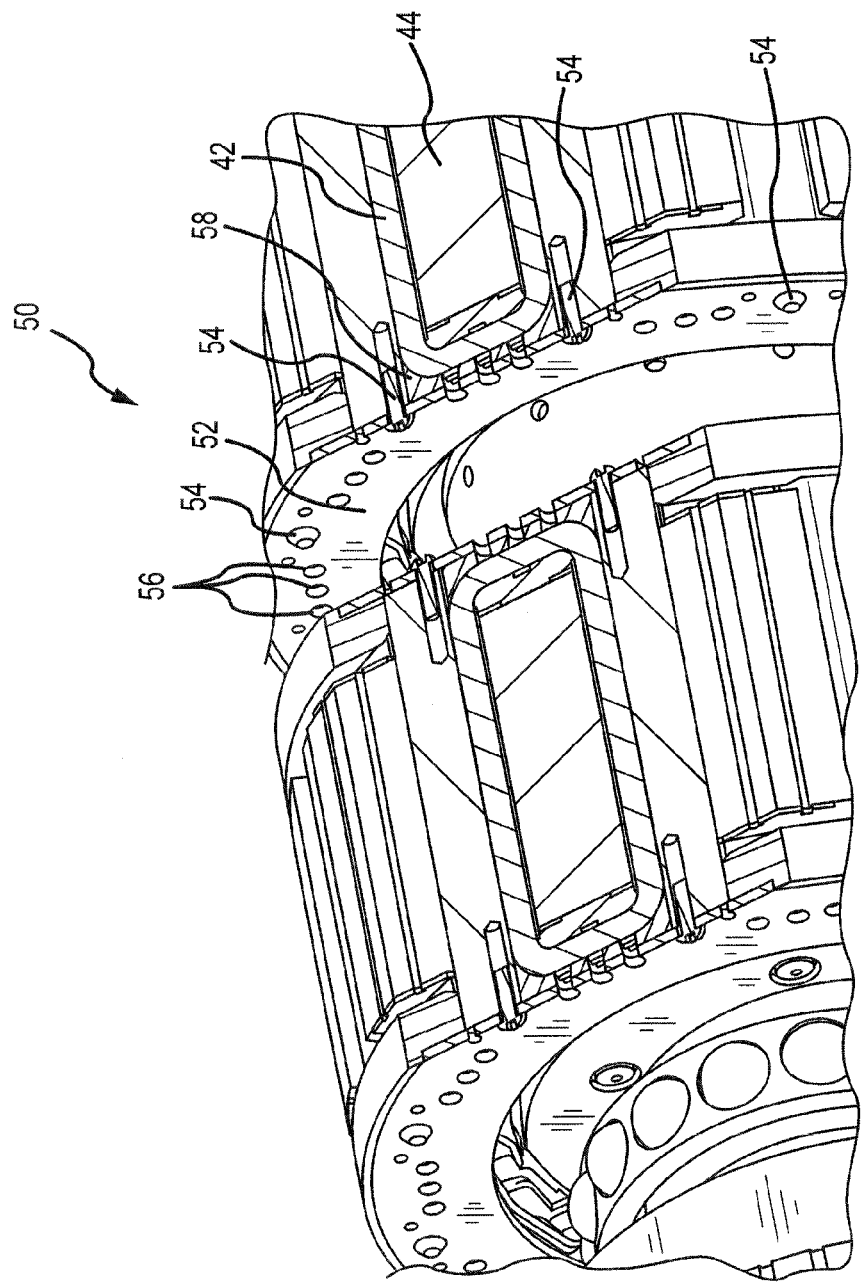
FIG. 3B illustrates a cut-away view of an example rotor system of a high speed electrical machine having an end turn support and cooling fixture, in accordance with various embodiments.

With particular reference to FIGS. 2 and 3B, a main stage generator rotor 20 may comprise a plurality of winding-pole sets 40 and a winding retention member 50. The winding retention member 50 may enclose the winding-pole set 40 and prevent dislocation of the windings 42, such as stretching, and direct oil to flow over the windings 42. In various embodiments, a main stage generator rotor 20 may comprise 12 winding-pole sets 40 spaced annularly around the central axis of the main stage generator rotor 20. However, any number of winding-pole sets 40 configured to produce a desired current and voltage under desired operating conditions may be selected.

With reference to FIGS. 2 and 3B, each winding-pole set 40 may comprise a winding 42 and a pole 44. A pole 44 may comprise a ferromagnetic mass extending radially outward from the main stage generator rotor 20. The structure may be noncontiguous, for example, the pole 44 may be made of planar layers called laminations, which may be connected together by a binder, such as an epoxy. Thus, each pole 44 may comprise a lamination stack. For example, a lamination stack may comprise a plurality of planar members that may be held together by epoxy, whereby a pole 44 is formed. A winding 42 may comprise a length of wire that is wrapped around the pole 44. In various embodiments, the wire is wrapped in a spiral, each turn lying in a plane substantially tangential to the rotational path of the pole 44 (e.g., about the rotational axis of the main stage generator rotor 20). The winding 42 may be wrapped so that consecutive turns of the spiral lie in planes progressively radially outward of one another.

Figure 4:
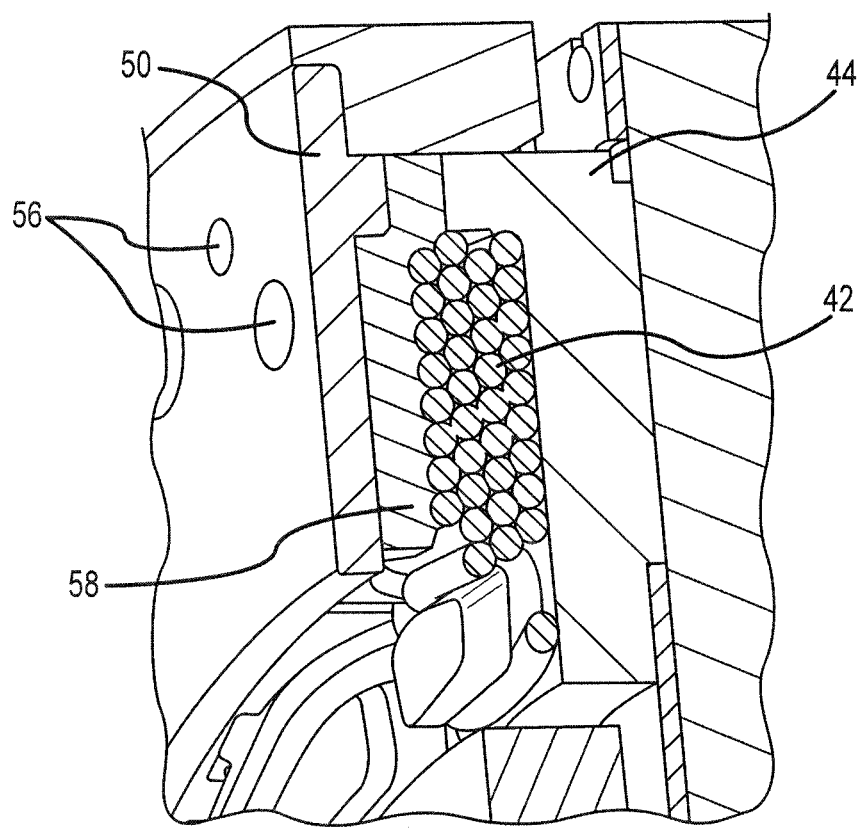
FIG. 4 illustrates a detailed cut-away view of an example end turn support and cooling fixture and windings of a rotor system of a high speed electrical machine.

With reference now to FIGS. 3A and 3B, and 4, a winding retention member 50 may comprise an axial containment plate 52, one or more tensioning apparatuses 54, cooling oil routing holes 56, and optionally, a winding guide plate 58. A winding retention member 50 may comprise an axial containment plate 52 comprising an annular plate axially adjacent to the winding-pole set 40. The winding retention member 50 may be positioned sufficiently close to the winding-pole set 40 to prevent windings 42 from radial movement, so that the axial containment plate 52 prevents windings 42 from axial movement sufficiently that the turns of the spiral comprising the winding 42 resist tumbling radially outward over one another. For instance, if the turns of the winding 42 were permitted to move axially by at least the thickness of the wire comprising the winding 42, then the turns could tumble radially outward over one another and the winding 42 could dislocate. Thus, the axial containment plate 52 is positioned less than one diameter of the wire comprising the winding 42, away from the winding 42 (as measured along the axis of the main stage generator rotor 20). In further embodiments, a second winding retention member 50 may be axially outboard of the windings 42 on the opposite outboard side of the winding-pole sets 40, so that the windings 42 are axially inboard of the first winding retention member 50 and the second winding retention member 50. Similarly, a second axial containment plate 52 may be axially outboard of the windings 42 on the opposite outboard side of the winding-pole sets 40, so that the windings 42 are axially inboard of each axial containment plate 52.

The axial containment plate 52 may comprise an annulus extending along a radial plane relative to the main stage generator rotor 20. The annulus may be disposed axially outward of the windings 42, trapping the windings 42 between the axial containment plate 52 and the pole 44. While the axial containment plate 52 is illustrated as an annulus herein, in further embodiments, the axial containment plate 52 may comprise any shape or configuration adapted to prevent the windings 42 from unwanted movement such as radial translation of the winding 42.

The winding retention member 50 may further comprise one or more tensioning apparatus 54. A tensioning apparatus 54 may comprise a retention screw. In further embodiments, a tensioning apparatus 54 may comprise a shaft or a threaded shaft, such as a bolt, or any other desired structure. A tensioning apparatus 54 may extend through an aperture disposed in the axial containment plate 52 and into the main stage generator rotor 20. In various embodiments, a tensioning apparatus 54 extends through an aperture disposed in the axial containment plate 52 that is located radially outward of each radially outermost side of each winding-pole set 40. Moreover, the tensioning apparatus 54 may extend through the axial containment plate 52 normal to the plane of the surface of the axial containment plate 52 through which the tensioning apparatus 54 penetrates. Thus, it may be said that a tensioning apparatus 54 extends between each winding-pole set 40, and into the main stage generator rotor 20, whereby the axial containment plate 52 of the winding retention member 50 is held in position relative to the windings 42.

Figure 6:
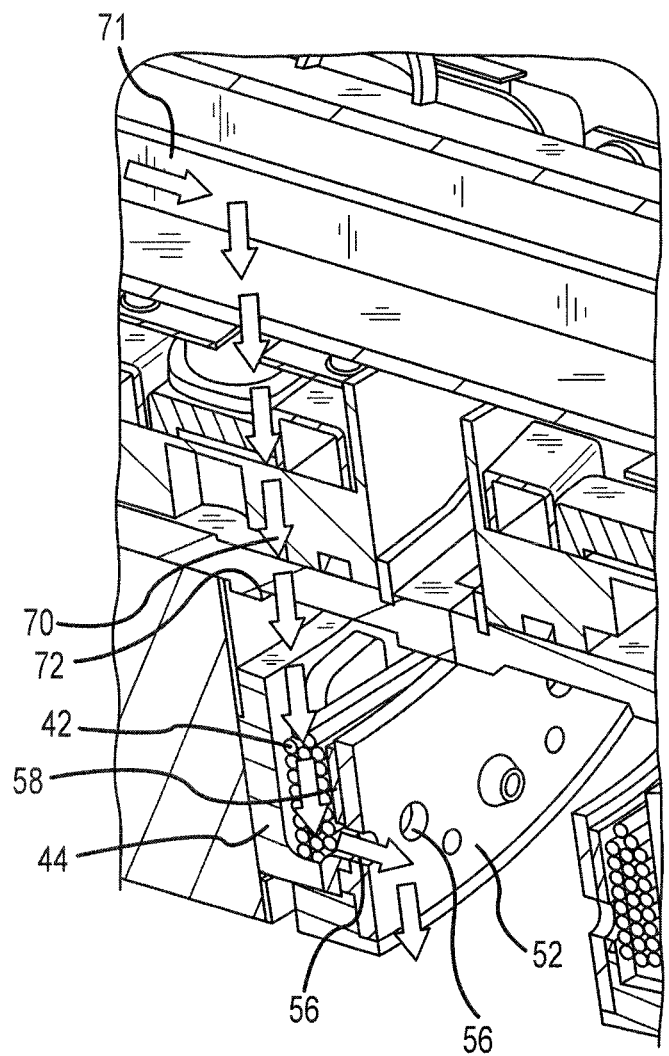
FIG. 6 illustrates an example flow path of cooling oil through a high-speed electrical machine having an end turn support and cooling fixture, in accordance with various embodiments.

With additional reference to FIG. 6, in various embodiments, the winding retention member 50 comprises an oil flow path 70. An oil flow path 70 may comprise a channel and/or aperture whereby cooling oil is conducted through the main stage generator rotor 20.

For example, cooling oil may travel from a cooling oil supply cavity 71 annularly inward of the main stage generator rotor 20. The oil may exit the cooling oil supply cavity 71 via a rotor inlet orifice 72 comprising an aperture radially inward of the windings 42, and radially outward of the cooling oil supply cavity 71, through which oil following the oil flow path 70 may flow radially outward of the cooling oil supply cavity 71 and toward the windings 42. In various embodiments, the oil is impelled radially outward by at least one of oil pressure and centrifugal force. Having been impelled radially outward, the oil may travel into fluidic communication with the windings 42. In this manner, the oil may be conveyed to the windings 42.

The cooling oil may travel over the windings 42 and between the pole 44 and the axial containment plate 52. In this manner, the axial containment plate 52 may guide the oil along the windings 42, increasing the duration of contact between the oil and the windings 42, as well as confining the oil to traveling in a radially outward path in contact with the windings 42. Accordingly, the oil flow path 70 may further comprise a passageway disposed between the windings 42 and the axial containment plate 52.

The axial containment plate 52 may comprise cooling oil routing holes 56 disposed in the axial containment plate 52 radially outward of the rotor inlet orifice 72. Cooling oil routing holes 56 may comprise apertures disposed through the axial containment plate 52, permitting the oil to escape from between the pole 44 and the axial containment plate 52 at or near the radially outermost end of the windings 42. In this manner, the axial containment plate 52 may limit the axial movement of the oil that is flowing radially over the windings 42, until the cooling oil reaches the cooling oil routing holes 56, where it may be permitted to travel axially, escaping from between the axial containment plate 52 and pole 44 and travel still further radially outward of the rotational axis of the main stage generator rotor 20 to contact and cool other generator components, such as main generator stators (not shown) located in an annular ring radially outboard of the generator rotor system 2.

Moreover, with additional reference to FIG. 2, the axial containment plate 52 may diminish the windage loss in the generator. For instance, the winding-pole sets 40 may conventionally act as paddles rotating through surrounding air and/or lubricant as they rotate about the axis of rotation 8. The axial containment plate 52 conforms the structure immediately adjacent to the winding-pole sets 40 to resemble the shape of a rotating drum, rather than the shape of a set of rotating paddles that the winding-pole sets 40 might otherwise resemble. In this manner, the axial containment plate 52 streamlines the generator rotor system 2 and the efficiency of the generator rotor system 2 is enhanced.

Figure 5:
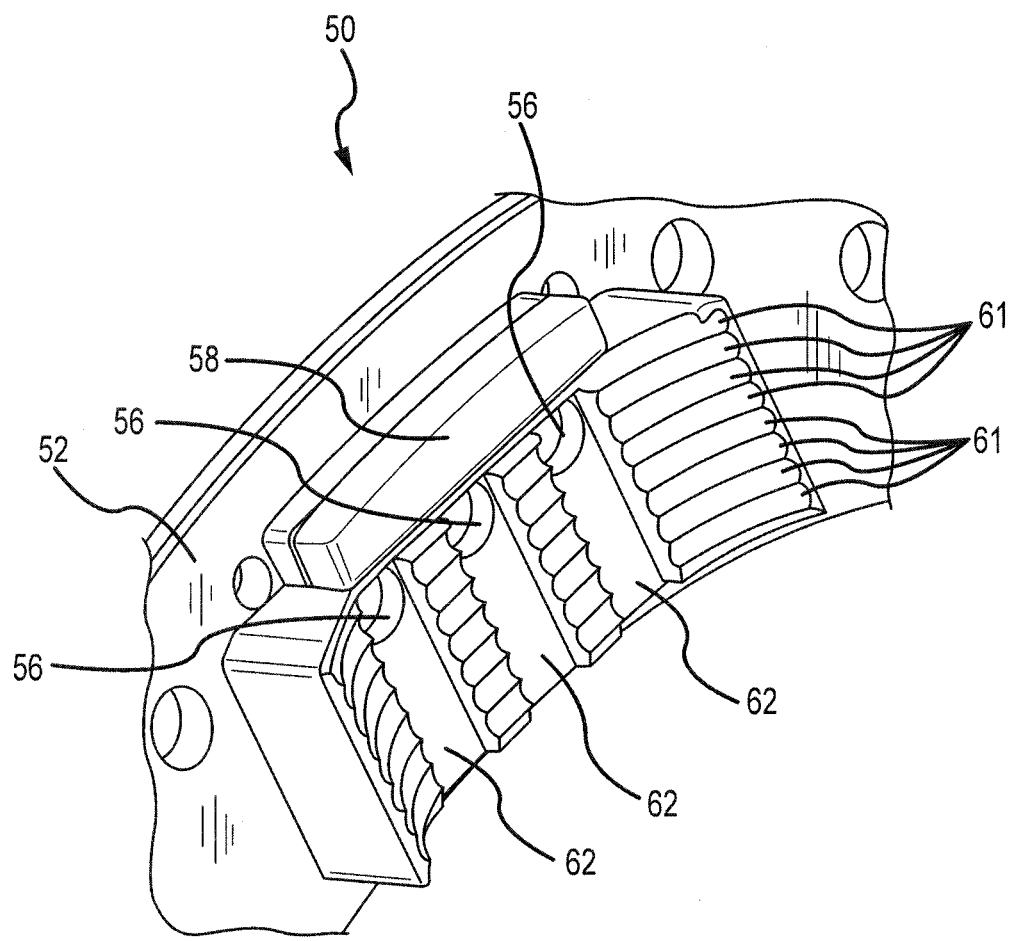
FIG. 5 illustrates an detailed view of various aspects of an end turn support and cooling fixture having a winding guide plate.

With additional reference to FIG. 5, a winding retention member 50 may further comprise a winding guide plate 58, although, in still further embodiments, the winding retention member 50 does not comprise a winding guide plate 58. The winding guide plate 58 provides enhanced support to the windings 42. For instance, the winding guide plate 58 may comprise a boss attached to the axial containment plate 52 of the winding retention member 50. The winding guide plate 58 may comprise a plurality of winding guide channels 61 corresponding to the shape of the windings 42. By corresponding to the shape of the windings 42, the winding guide channels 61 may prevent movement of the windings 42. In this manner, the windings 42 are secured against the influence of centrifugal force. Moreover, the winding guide plate 58 may further comprise a plurality of cooling oil guide channels 62 forming a portion of oil flow path 70 (FIG. 6). Cooling oil guide channels 62 may comprise troughs cut transverse to the winding guide channels 61 and permitting oil to flow among the winding guide channels 61 so that different portions of the winding 42 may contact the oil. The cooling oil guide channels 62 terminate in apertures corresponding to the cooling oil routing holes 56 of the axial containment plate 52. In various embodiments, a separate cooling oil guide channel 62 corresponds to each cooling oil routing hole 56, although in further embodiments, multiple cooling oil guide channels 62 terminate at a shared cooling oil routing hole. In this manner, the oil flow path 70 may continue radially outward of the main stage generator rotor 20, for example, to permit the oil to reach other components, such as main stage generator stators.

Having discussed various aspects of a generator rotor system 2, a generator rotor system 2 may be made of many different materials or combinations of materials. For example, various components of the system may be made from metal. For example, various aspects of an generator rotor system 2 may comprise metal, such as titanium, aluminum, steel, or stainless steel, though it may comprise numerous other materials configured to provide support, such as, for example, composite, ceramic, plastics, polymers, alloys, glass, binder, epoxy, polyester, acrylic, or any material or combination of materials having desired material properties, such as heat tolerance, strength, stiffness, or weight. In various embodiments, various portions of a generator rotor system 2 as disclosed herein are made of different materials or combinations of materials, and/or may comprise coatings.

In various embodiments, a generator rotor system 2 may comprise multiple materials, or any material configuration suitable to enhance or reinforce the resiliency and/or support of the system when subjected to wear in an aircraft operating environment or to satisfy other desired electromagnetic, chemical, physical, or material properties, for example radar signature, heat generation, efficiency, electrical output, strength, or heat tolerance.

While the systems described herein have been described in the context of aircraft applications; however, one will appreciate in light of the present disclosure, that the systems described herein may be used in various other applications, for example, different vehicles, such as cars, trucks, busses, trains, boats, and submersible vehicles, space vehicles including manned and unmanned orbital and sub-orbital vehicles, or any other vehicle or device, or in connection with industrial processes, or industrial generators, or power plant generator systems, or portable generators, or propulsion systems, or any other system or process having need for electric machines.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for". As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A main stage generator rotor comprising:
a winding-pole set comprising a winding and a pole; and
a winding retention member;
wherein the main stage generator rotor has an axis of rotation,
wherein the axis of rotation has a radius,
wherein the winding retention member is disposed outboard of the winding-pole set along the axis of rotation,
whereby the winding of the winding-pole set is axially confined between the winding retention member and the pole of the winding-pole set, and
whereby the winding of the winding-pole set is constrained by the winding retention member from radially translating,
the winding retention member comprising:
an axial containment plate disposed outward of the axis of rotation with respect to the winding of the winding-pole set and constraining the winding from radially translating;
a tensioning apparatus whereby the axial containment plate is retained in position relative to the winding-pole set;
a first axially facing surface;
a second axially facing surface opposite the winding retention member from the first axially facing surface;
a cooling oil routing hole extending axially from the first axially facing surface, through the winding retention member, to the second axially facing surface, whereby cooling oil may travel axially through the axial containment plate, and
an oil flow path disposed between a rotor inlet orifice and the cooling oil routing hole whereby oil may flow in fluidic communication with the winding,
wherein the cooling oil routing hole is axially in-line with the winding.

2. The main stage generator rotor according to claim 1, wherein the main stage generator rotor comprises twelve winding-pole sets.

3. The main stage generator rotor according to claim 1, wherein the axial containment plate comprises an annulus.

4. The main stage generator rotor according to claim 1, further comprising a winding guide plate attached to the axial containment plate and disposed axially outward of the winding of the winding-pole set and in mechanical contact with the winding, and further disposed axially inward of the axial containment plate, and in mechanical contact with the axial containment plate.

5. The main stage generator rotor according to claim 4, wherein the winding guide plate further comprises a winding guide channel corresponding to shape of the winding of the winding-pole set.

6. The main stage generator rotor according to claim 5, wherein the winding guide plate further comprises a cooling oil guide channel comprising a trough cut transverse to the winding guide channel and permitting oil to flow through the winding guide channel.

7. The main stage generator rotor according to claim 6, wherein the winding guide channel is circumferentially in-line with the cooling oil routing hole, whereby the cooling oil may travel radially between the axial containment plate and the winding.

8. The main stage generator rotor according to claim 6, wherein the winding guide channel terminates in an aperture corresponding to the cooling oil routing hole of the axial containment plate.

9. A generator rotor system comprising:
a first exciter rotor;
a second exciter rotor;
a permanent magnet rotor;
a first main stage generator rotor; and
a second main stage generator rotor, wherein each of the first main stage generator rotor and the second main stage generator rotor share an axis of rotation;
wherein the first exciter rotor is disposed at an axial outboard end of the generator rotor system,
wherein the permanent magnet rotor is disposed at a second axial outboard end of the generator rotor system,
wherein the second exciter rotor is disposed adjacent to and axially inboard of the permanent magnet rotor,
wherein the first main stage generator rotor and the second main stage generator rotor are both disposed axially inboard of the first exciter rotor and the second exciter rotor, and
wherein each of the first main stage generator rotor and the second main stage generator rotor comprise:
a winding-pole set comprising a winding and a pole; and
a winding retention member;
wherein the axis of rotation has a radius,
wherein the winding retention member is disposed outboard of the winding-pole set along the axis of rotation,
whereby the winding of the winding-pole set is axially confined between the winding retention member and the pole of the winding-pole set, and
whereby the winding of the winding-pole set is constrained by the winding retention member from radially translating,
the winding retention member comprising:
an axial containment plate disposed outward of the axis of rotation with respect to the winding of the winding-pole set and constraining the winding from radially translating;
a tensioning apparatus whereby the axial containment plate is retained in position relative to the winding-pole set;
a first axially facing surface;
a second axially facing surface opposite the winding retention member from the first axially facing surface;
a cooling oil routing hole extending axially from the first axially facing surface, through the winding retention member, to the second axially facing surface, whereby cooling oil may travel axially through the axial containment plate, and
an oil flow path disposed between a rotor inlet orifice and the cooling oil routing hole whereby oil may flow in fluidic communication with the winding,
wherein the cooling oil routing hole is axially in-line with the winding.

10. The generator rotor system according to claim 9, wherein the first main stage generator rotor and the second main stage generator rotor each comprises twelve winding-pole sets.

* * * * *